UNITED STATES PATENT OFFICE.

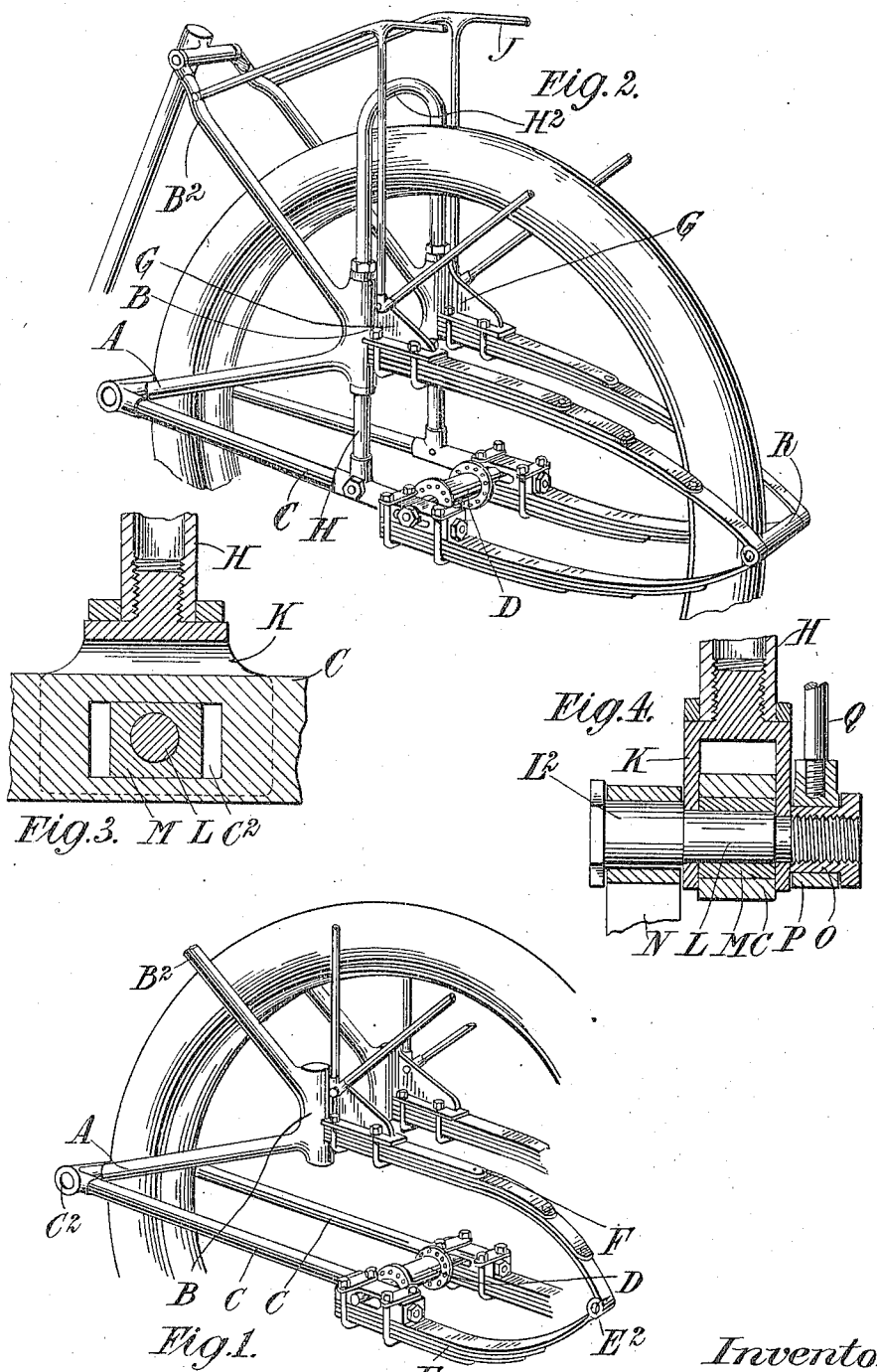

MAURICE P. J. VAN GEERT, OF BIRMINGHAM, ENGLAND.

REAR-SPRING SUSPENSION FOR MOTOR-CYCLES.

1,181,047.

Specification of Letters Patent.

Patented Apr. 25, 1916.

Application filed January 11, 1916. Serial No. 71,519.

*To all whom it may concern:*

Be it known that I, MAURICE POLYDORE JACOB VAN GEERT, a subject of the King of Belgium, and resident of 3 Anderton road, Sparkbrook, Birmingham, in the county of Warwick, England, have invented certain new and useful Improvements in Rear-Spring Suspension for Motor-Cycles, of which the following is a specification.

This invention relates to the rear springs of motor cycles of the kind in which the rear wheel is connected to the frame by radius rods.

It has for its object to provide a simple construction embodying laminated springs.

The rear part of the frame comprises as usual the seat tube, to the top of which are attached the compression stays, and to the bottom of which are attached the chain stays, the chain stays and compression stays being connected together by a rear junction lug.

According to this invention, the radius rods are arranged beneath the chain stays, and to the end of each rod and to each junction lug is attached a leaf spring, the extremities of which are connected together. Preferably each radius rod carries a guide rod adapted to pass through a guide carried on, by, or close to the rear junction lug.

In the accompanying drawings, Figure 1 is a perspective view showing one method of carrying out this invention. Fig. 2 is a similar view showing the preferred application, and Figs. 3 and 4 are sectional views showing one method of attaching the guide rod to the radius rods.

Like letters indicate like parts throughout the drawings.

In the construction shown in Fig. 1 it will be seen that the chain stays A slope upward more than usual and that the junction lug B by which each chain stay is connected with the adjacent compression stay $B^2$ is specially shaped. Beneath each chain stay is a radius rod C having a pivotal mounting at $C^2$ on some part of the rear frame. The radius rods carry the spindle of the rear wheel hub D and to the end of each is attached a leaf spring E. A similar spring F is attached to the rear junction lug B and the extremities of the two springs E and F are connected together at $E^2$. By this means the movement of the wheel is properly guided by means of radius rods and laminated springs may be used which, as is known, constitute the best type of spring for use on vehicles.

In the construction illustrated in Figs. 2 to 4 the frame is provided with similar compression and chain stays $B^2$ and A with junction lugs B. The latter are slightly higher than usual, and below the chain stays are the radius rods C. These are pivoted at the forward end and the road wheel is carried by the rear ends as in the first construction.

Each lug B is formed with a tubular or other suitable guide member G. Engaging each of these is a vertical guide rod H, and the two guide rods are connected together at $H^2$ above the wheel. At their lower ends they have a pivotal and sliding or other suitable connection with the radius rods, and the springs E and F are employed as in the construction shown in Fig. 1.

The luggage carrier J may be supported from the frame in any suitable manner and is therefore spring supported, but the stand and mudguard stays are connected with the radius rods C, or guide rods.

The following is the preferred construction of connection between these two rods, although any other suitable connection may be used:—To the lower end of each guide rod H (see Figs. 3 and 4) is attached a forked member K through which passes the radius rod C. Upon a suitable pin L carried by the fork member is a square block M which slides in a rectangular slot $C^2$ in the radius rod. This block can swivel on the pin L and can slide in relation to the radius rod so that the required pivotal and sliding connection is obtained. Upon the head $L^2$ of the pin L may be pivotally mounted one side N of the stand and upon the other end of the pin or upon the nut O screwing thereon may swivel an eye P to which are attached the mudguard stays, one of which is shown at Q.

The top of the mudguard (not shown) is preferably bolted or clipped to the guide rods at $H^2$, and when this connection is broken the complete mudguard can be rotated around the wheel, the eye P turning on the nut O, exposing a considerable length of tire, which facilitates repairing.

If desired the springs on both sides may be connected together by a connection R. The shape of the springs may be varied, being if desired almost flat.

What I claim as my invention, and de- sire to secure by Letters Patent of the United States is:—

1. In a motor cycle, a frame having chain stays, radius rods pivoted below said chain stays and carrying the wheel spindle, a laminated spring attached to each chain stay, a laminated spring attached to each radius rod and a connection between each pair of laminated springs, substantially as set forth.

2. In a motor cycle, a frame, radius rods pivoted to said frame and carrying the wheel spindle, guides on said frame, guide rods on said radius rods engaging said guides, a pair of laminated springs carried by said frame, a pair of laminated springs attached to said radius rods, and a connection between each pair of laminated springs, substantially as set forth.

3. In a motor cycle, a frame, radius rods pivoted to said frame and carrying the wheel spindle, guides on said frame, guide rods engaging said guides, a pivotal and sliding connection between each of said guide rods and said radius rods, a pair of laminated springs attached to said radius rods, a pair of laminated springs carried by said frame and a connection between each pair of laminated springs, substantially as set forth.

4. In a motor cycle, a frame, rear junction lugs on said frame, a laminated spring carried by each junction lug, radius rods pivoted to said frame, a laminated spring attached to each radius rod and connected with the laminated spring on said frame, a guide on each junction lug, a guide rod engaging each guide, a bolt carried by each guide rod and having a pivotal and sliding connection with each radius rod, substantially as set forth.

In testimony whereof I have signed my name to this specification in the presence of two subscribing witnesses.

M. P. J. VAN GEERT.

Witnesses:
ERNEST HARPER,
KATHLEEN M. THOMPSON.

Copies of this patent may be obtained for five cents each, by addressing the "Commissioner of Patents, Washington, D. C."